(12) United States Patent
Kempinski et al.

(10) Patent No.: US 10,254,831 B2
(45) Date of Patent: Apr. 9, 2019

(54) SYSTEM AND METHOD FOR DETECTING A GAZE OF A VIEWER

(71) Applicants: Yitzchak Kempinski, Geva Binyamin (IL); David Asulin, Beit Horon (IL); Zehava Lasker, Beit El (IL); Sophia Frij, Maale Adumim (IL); Ronen Harati, Ra'anana (IL)

(72) Inventors: Yitzchak Kempinski, Geva Binyamin (IL); David Asulin, Beit Horon (IL); Zehava Lasker, Beit El (IL); Sophia Frij, Maale Adumim (IL); Ronen Harati, Ra'anana (IL)

(73) Assignee: Umoove Services Ltd., Jerusalem (IL)

( * ) Notice: Subject to any disclaimer, the term of this patent is extended or adjusted under 35 U.S.C. 154(b) by 0 days.

(21) Appl. No.: 15/586,403

(22) Filed: May 4, 2017

(65) Prior Publication Data
US 2017/0236304 A1 Aug. 17, 2017

Related U.S. Application Data

(63) Continuation-in-part of application No. 14/680,372, filed on Apr. 7, 2015, now abandoned.

(60) Provisional application No. 61/976,529, filed on Apr. 8, 2014.

(51) Int. Cl.
*G06F 3/01* (2006.01)
*G06K 9/00* (2006.01)
*G06K 9/46* (2006.01)

(52) U.S. Cl.
CPC .......... *G06F 3/013* (2013.01); *G06K 9/0061* (2013.01); *G06K 9/00281* (2013.01); *G06K 9/4642* (2013.01)

(58) Field of Classification Search
CPC ........ G06K 9/00; G06K 9/52; G06K 9/00597; G06K 9/00604; G06K 9/0061; G06T 7/00; G06T 7/60; G06T 7/20; G06T 2207/30216; G06T 7/408; G06F 3/01
USPC ........................................ 382/117
See application file for complete search history.

(56) References Cited

U.S. PATENT DOCUMENTS 5,471,542 A * 11/1995 Ragland ................. A61B 3/113
351/208
2016/0284123 A1* 9/2016 Hare ......................... G06T 7/55

OTHER PUBLICATIONS

Danjie et al., "Robust and real-time torsional eye position calculation using a template-matching technique", May 2003, Elsevier, retrieved on Oct. 27, 2016 from Internet from: <http://research.mssm.edu/moores01/publications/torsion%20danjie.pdf>.*

* cited by examiner

*Primary Examiner* — Gregory F Cunningham
(74) *Attorney, Agent, or Firm* — Pearl Cohen Zedek Latzer Baratz LLP

(57) ABSTRACT

A method of determining a point or object on a digital display that is being gazed at by a viewer by capturing an image of the viewer's iris and at least one other feature of the viewer's face, calculating an imaginary line from the object being viewed, to the iris and continuing to an imaginary center of the viewer's eye, then calculating a position of the center of the eye relative to the other feature of the viewer's face. Upon a change in the position of the eye and the iris, a calculation can be made of a position of the iris in a second image. An imaginary line can be extended out from the center of the eye, through the new position of the iris onto the digital display to determine the point of gaze of the viewer.

18 Claims, 15 Drawing Sheets

CALCULATING A SECOND LOCATION OF THE POINT INSIDE THE EYE UPON THE CHANGE IN THE LOCATION IN THE FACIAL FEATURE, AND CALCULATING A SECOND LOCATION OF THE IRIS
— 408

IDENTIFYING AN OBJECT THAT IS THE SUBJECT OF THE GAZE OF THE VIEWER, THE OBJECT BEING ON A VECTOR FROM THE SECOND LOCATION OF THE POINT INSIDE THE EYE AND PASSING THROUGH SECOND LOCATION OF THE IRIS.
— 410

Fig. 4B

SYSTEM AND METHOD FOR DETECTING A GAZE OF A VIEWER

CROSS REFERENCE TO RELATED APPLICATION

This application is a continuation-in-part of U.S. patent application Ser. No. 14/680,372, filed Apr. 7, 2015, which claims the benefit of U.S. Provisional Patent Application 61/976,529 filed on Apr. 8, 2014, each of which is incorporated by reference in its entirety.

FIELD OF INVENTION

The present invention relates to gaze detection. More particularly, the present invention relates to systems and methods for detection of the orientation of a gaze of a viewer.

BACKGROUND OF THE INVENTION

Content presented for viewing by a user may include items or objects that are within the view of the user. For example, a single screen on an electronic display may include one or more text items, and one or more images. Though all of such items may be presented for viewing, there may be a desire to know whether the viewer actually viewed such items, which ones were viewed and for how long. As the eyes of the viewer are complex organs that move in a very specific way, where the pupil is a hole located in the center of the iris of the eye that allows light to strike the retina, locating the exact point of the gaze of the viewer is difficult to accomplish.

Further, various physical maladies and indications may be accompanied by or result in changes or variations in the capacity of a viewer to track, view, or follow an item in the field of view of the viewer.

SUMMARY OF THE INVENTION

There is thus provided, in accordance with some embodiments of the invention, a method for viewer gaze detection, the method including capturing with an imager and using visible light, a first two-dimensional image of an iris and at least one facial feature of the viewer, wherein the imager is located or positioned at a known location relative to a first object on an electronic display, capturing, using the imager, a second two-dimensional image of the iris and the at least one facial feature, and identifying a second object displayed on the electronic display, wherein the second object is the subject (e.g. target) of a gaze of the viewer.

In some embodiments, the electronic display may be a mobile display, and the imager is a mobile imager. Some embodiments may include calculating a change between the first image and the second image, of a location of the iris and of a location of the facial feature. In some embodiments, the change in said location of the iris may be less than the size or distance of a pixel of the second image some embodiments may include calculating or determining a location of a point inside of an eye of the viewer, the point on a vector from the first object and passing through the iris.

In some embodiments, an embodiment may further include calculating or determining a location of the point inside the eye of the viewer relative to a location of the at least one facial feature. In some embodiments, an embodiment may further include identifying the nose-bridge of the viewer. In some embodiments, an embodiment may further include identifying the nose-end of the viewer.

There is thus provided, in accordance with some embodiments of the invention, a method of identifying a point of gaze of a viewer, an embodiment including identifying a location of an iris of the viewer in a two-dimensional image of the viewer, the image captured by an imager using visible light, the imager at a known location relative to an object viewed by the viewer, calculating a location of a point inside the eye, the point on a vector from the object viewed by the user and passing though the iris, tracking a location of an object on a face of the user, determining a location of the point in the eye relative to the location of the object on the face of the user, and identifying the point of gaze on a vector from the point inside the eye and passing through the iris to the point of gaze.

In some embodiments, an embodiment may further include tracking at least one corner of the eye. In some embodiments, an embodiment may further include filtering out (e.g., remove from the image or from consideration) pairs of eye corners, wherein the angle between the length of the line connecting the corners to the line connecting the center of the iris centers is larger than a predefined value.

In some embodiments, an embodiment may further include calculating the size of the iris. In some embodiments, an embodiment may further include validating the results based on predetermined parameters. In some embodiments, an embodiment may further include identifying the darkest area. In some embodiments, an embodiment may further include identifying the nose-bridge of the viewer.

There is thus provided, in accordance with some embodiments of the invention, a method of identifying an object that is the subject of a gaze of a viewer, an embodiment including capturing a first two-dimensional image of an iris of a user, the capturing using a single imager and visible light, and calculating a first location of the iris, calculating a point inside an eye of a viewer, the point on a vector from an object viewed by the user passing through the iris of the user, calculating or determining a first location of the point inside the eye, the first location relative to a first location of a facial feature of the viewer in the first image, detecting in a second two-dimensional image a change in location of the facial feature, calculating a second location of the point inside the eye upon the change in the location in the facial feature, and a second location of the iris, and identifying the object that is the subject of the gaze of the viewer, on a vector from the second location of the point inside the eye and passing through the second location of the iris.

In some embodiments, an embodiment may further include calculating the size of the iris. In some embodiments, an embodiment may further include validating the results based on predetermined parameters. In some embodiments, an embodiment may further include identifying the darkest area. In some embodiments, an embodiment may further include identifying the nose-bridge of the viewer.

There is thus provided, in accordance with some embodiments of the invention, a gaze detection system including an imager suitable to use visible light to capture two-dimensional images of an iris and of a facial feature of a viewer, the imager at a known position relative to objects being displayed on an electronic display, and a processor configured to allow determination that an object of the objects is being viewed by the viewer at a defined time. In some embodiments, the imager is a mobile imager, and the electronic display is a mobile display.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 4B shows a flow diagram for identifying an object that is the subject of a gaze, according to some embodiments of the invention;

Figure 1A:
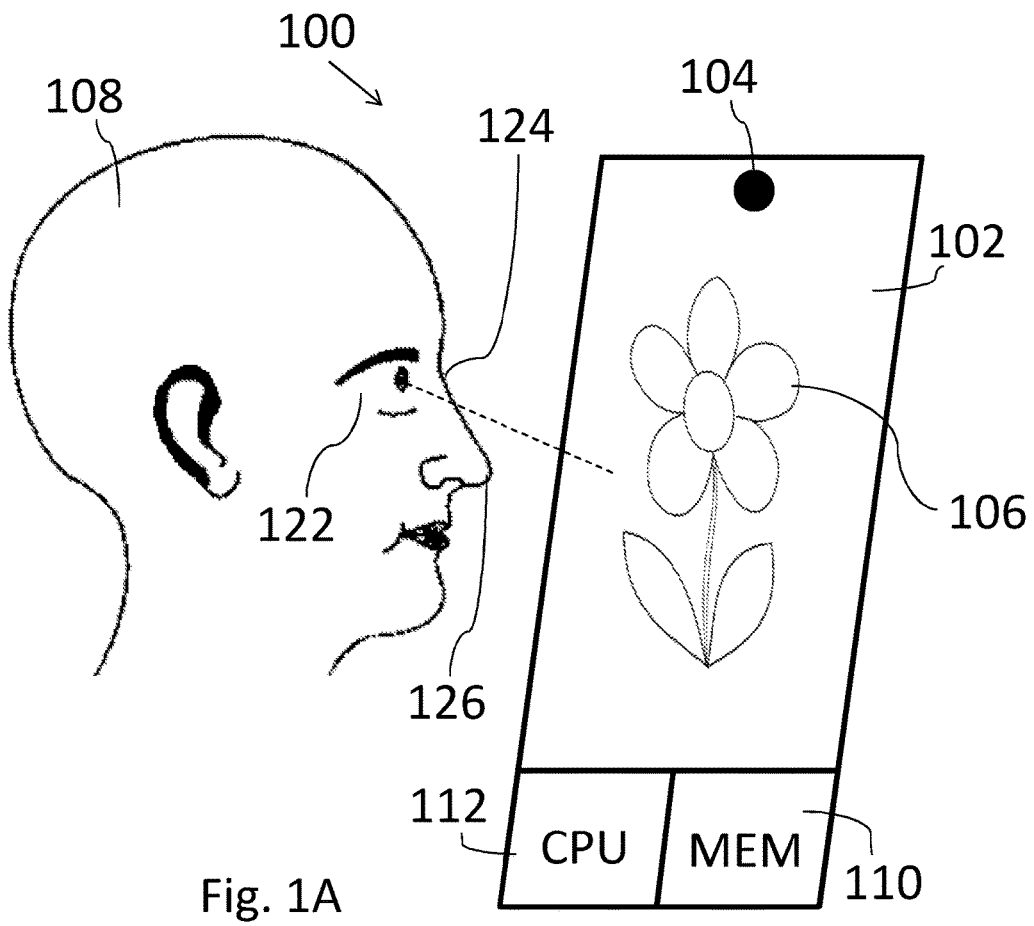
FIG. 1A schematically illustrates a gaze detection system, according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Embodiments of the invention may include an article such as a non-transitory computer or processor readable medium, or a computer or processor storage medium, such as for example a memory, a disk drive, or a USB flash memory or other non-volatile memory, encoding, including or storing instructions, e.g., computer-executable instructions, which when executed by a processor or controller, cause the processor to carry out methods disclosed herein.

It should be noted that as used hereinafter, a viewer may be, in addition to its regular meaning, referred to a person (or animal) that is looking at or that is situated in a position to look at a display, screen, object, or object shown on a screen.

It should be noted that as used hereinafter, an iris or pupil may be, in addition to its regular meaning, referred to or include an area of one or more eyes of a viewer that includes an area of a pupil and iris or such portion of the pupil as may be covered or uncovered in the dilation and constricting of the iris. In some embodiments a differentiation between the iris and the pupil may not be required, such that an entire area encompassed by the iris may be included. Furthermore, a center of the iris may include a geometric center of the iris or some other point within the pupil or one or more eyes.

It should be noted that as used hereinafter, the term center of the eyeball may be, and in addition to its regular meaning, referred to an actual geometric center of one or more eyeballs of a viewer. Alternatively or in addition, it may be referred to an estimate of a center of an eyeball of a user or to some other point or area identifiable in three dimensional space within one or more eyeballs of a viewer relative to one or more other points or locations of a body part of the user. In some embodiments, a center of an eyeball may refer to one or more points within an eyeball that may be found on an imaginary line passing from an object on a display and through an iris of a viewer, or vice versa. In some embodiments, a radius of an eyeball may be assumed to be 1.25 to 1.3 centimeters. Other estimates or assumptions about a radius or shape of an eyeball may be used or applied based on an estimated physical characteristics of a user or population of users. In some embodiments, such radius may not be an actual geometric radius of an eyeball, but rather a distance or vector (e.g., mathematical construct that has both a magnitude and a direction) from an iris to a center of the eyeball.

It should be noted that as used hereinafter, the term detecting may be, and in addition to its regular meaning, referred to one or more processes of establishing a presence of an object or part of an object such as a head, face, nose, eyes, eye corners or other body parts within a field of view of camera or in an image. Detecting may also include one or more processes of finding a location and/or angle of one or more of such objects relative to one or more of such other objects and/or relative to one or more of an electronic display screen or an object displayed on a screen or relative to a camera. In some embodiment such location of the detected part may be captured as coordinates or angles of one or more axis such as an X, Y or Z axis (where Z axis may refer to a distance or vector of an object relative to one or both of camera and screen). The term tracking may, in addition to its regular meaning, include one or more processes of finding a location and/or angle of one or more of objects in one or more images, series of images or images captured over a time period, and/or determining a change in a location of such object between such images. In some embodiments, a result of a detection or tracking of a gaze may yield one or more coordinates or values indicating positions, locations or objects that a viewer is viewing at a particular time, in the course of a series of captured images or at other intervals. In some embodiments a result of tracking may be translated or interpreted into a pattern of movements of one or more eyes. In some embodiments a change in one or more objects that appear on a display or screen may trigger the tracking. For example, in some embodiments, gaze tracking may indicate that a viewer is looking at or following a particular object on a screen over a given number of frames or captured images of the viewer. Such tracking, and the objects or locations that the user is viewing at some time in the present or in the past, or that the user may be looking at, may be recorded in a memory and/or may be manifested in a change in a depiction of the object being viewed or in some other object. Thus, the depicted object may interact and/or change according to the gaze of the viewer. For example, if a user is gazing at an object displayed on a screen, a processor may issue a signal to highlight, expand, enlarge or reduce the object that is the subject of the gaze (e.g., the object that the viewer is looking at, or the object that is at the center of the viewer's field of view). Other manifestations, triggers, or actions to be taken in response to a detection or tracking of an object by a viewer may be implemented.

It should be noted that as used hereinafter, the term 'gaze' or 'point of gaze' may, in addition to its usual meaning, indicate or identify a process of looking at, studying, glancing at, or focusing on an object, text, image, graphic, area or, with respect to an electronic display, a pixel or group of pixels that is being looked at or followed by one or more eyes of a viewer. A gaze of a viewer may be relevant for a particular time period. For example, a viewer may have gazed at a displayed object for a consecutive number of seconds, or for a number of seconds over a period when a particular object appeared on the screen. A gaze of a viewer may be relevant for a particular object or for a class of objects. For example, a gaze or a person may be tracked as he looks at an apple or at an apple displayed on a screen. A gaze of a person may be tracked as the person looks at various circular objects or dog depictions on a screen, or on depictions of other objects or classes of objects.

Figure 1B:
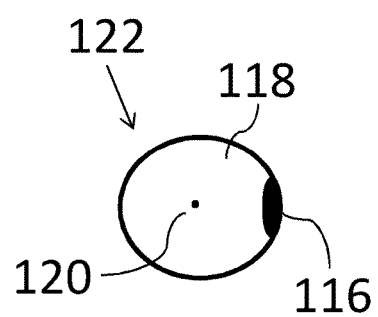
FIG. 1B schematically illustrates a cross-sectional view of an eyeball of a viewer, according to some embodiments of the invention.

Reference is now made to FIGS. 1A-1B, where FIG. 1A schematically illustrates a gaze detection system 100 and FIG. 1B schematically illustrates a cross-sectional view of an eyeball of a viewer, according to some embodiments of the invention. Gaze detection system 100 may include an electronic display screen 102 and a camera 104, being for example an imager or an image capturing sensor. Camera 104 may be at a known distance, location and angle relative to display 102, and from a content or object 106 displayed on display 102. It should be appreciated that display screen 102 may display content 106 such as for example text, images or graphics or other items which may be viewed by a user or viewer 108. Such content 106 may be still or video and may move, or be moved, on display 102. Gaze detection system 100 may be associated with one or more mass data storage memory units 110 and a processor 112, such as a computer processing unit (CPU). Processor 112 may be configured to perform methods as disclosed herein by for example executing software or code, for example stored in memory 110.

In some embodiments, camera 104 may be or include an imaging device suitable to capture two-dimensional still or video images using visible light. According to some embodiments, camera 104 and display 102 may be included in a mobile computerized device such as a cellular telephone, tablet computer, laptop computer or other mobile device. In some embodiments, camera 104 and screen 102 may be associated with a fixed or non-portable device such as a workstation or desktop computer. It should be noted that other configurations may also be possible, for instance camera 104 and screen 102 may be associated with two separate computerized devices.

In operation, embodiments of the invention may detect and track a head, face, eye(s), corner(s) of eyes, nose, bridge of nose or other body part of viewer 108 in one or more images that are captured by camera 104. The position of one or more irises 116 of viewer 108 may be detected and tracked, such that an estimate may be calculated or determined of a position of the center 120 of one or more eyeballs 118 by calculating or determining the vector (e.g., mathematical object that has both a magnitude and a direction) between the point of calibration (such as camera 104, or another known point) and the iris 116, or the center of the area detected as the iris 116 in the image. Then, such vector may be extended (e.g. in the same direction) to center 120 of the eyeball 118 based on an estimated eyeball radius. It should be noted that the position, location or vector of such center 120 of eyeball 118 may be calculated or determined relative to a position, location or vector of the body part that is also being tracked, such as an eye corner 122, bridge of nose 124, or edge of nose 126.

According to some embodiments, the position of such as eye corners 122 and/or bridge of a nose 124 and/or nose edge 126 may be tracked in one or more images. A vector, position or location of eyeball center 120 may be calculated or determined after giving effect to the tracked changes in position of at least one of eye corner 122, nose-bridge 124, or nose edge. It should be appreciated that the position or location of iris 116, as calculated from the iris tracking on the one hand, the position of eyeball center 120 as calculated from the tracking of eye corners 122 and/or nose bridge 124, and the known position of eyeball center 120 relative to such eye corners 122 and/or nose-bridge 124 and/or nose edge 126, may allow an imaginary line or vector to be calculated from eyeball center 120, through iris 116, and further to content 106 on display 102 that is the subject of the gaze.

Embodiments of the invention may include a system 100 that has an imager 104 suitable to capture, using visible light, two dimensional images of an iris 116 and of a facial feature of a viewer 108, where imager 104 is located or positioned at a known position relative to objects being displayed on an electronic display 102. Embodiments of such system 100 may include a processor 112 to determine that at least one of the object 106 is being viewed by viewer 108 at a certain (or defined) time. In some embodiments, imager 104 and the display 102 may be or include a mobile imager, a mobile display, such as those that may be included in a cellular telephone, smartphone, tablet computer, laptop computer or other electronic devices. Embodiments of the invention may be used to detect that viewer 108 is looking at a real world object, where the real world object is located or positioned at a known distance and position relative to for example imager 104.

Figure 2:
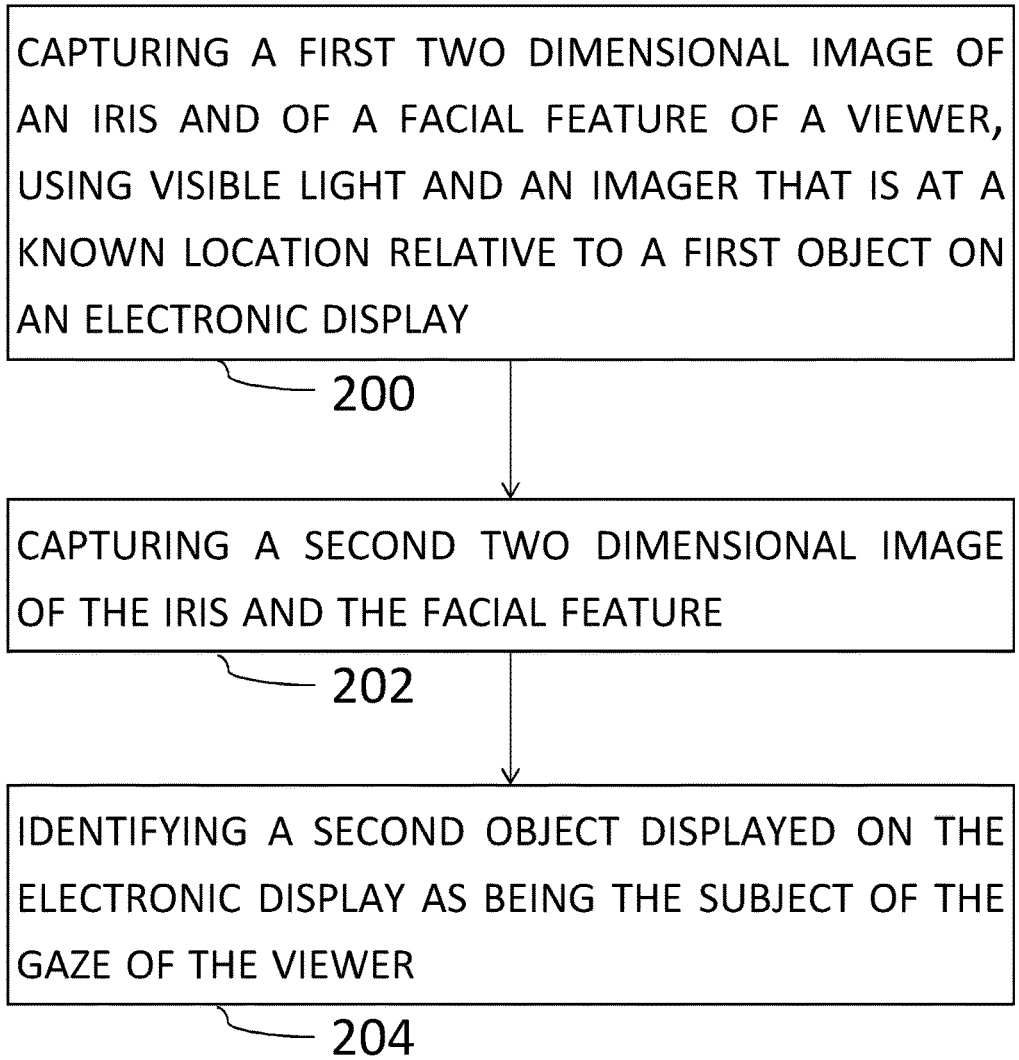
FIG. 2 shows a flow diagram for identifying objects on an electronic display, according to some embodiments of the invention.

Reference is now made to FIG. 2, which shows a flow diagram for identifying objects on an electronic display, according to some embodiments of the invention. Embodiments of the invention may include in block 200 capturing or receiving a first two-dimensional image of an iris and a facial feature of a viewer, using visible light by way of an imager that is located or positioned at a known location or position relative to a first object on an electronic display. In block 202, some embodiments of capturing the imager a second two-dimensional image of the iris and the facial feature. In block 204, some embodiments of identifying a second object displayed on the electronic display as being the subject of a gaze of the viewer. In some embodiments the objects may be displayed on a display of a mobile device and the imager may be connected to the mobile device.

Some embodiments of the method may include calculating or determining a change in location of the iris and the facial feature between the captured first and second images. In some embodiments, some embodiments of the method may include calculating or determining a location of a point inside of an eye of the viewer, where this point is on a vector from the first object that passes through the iris. In some embodiments, some embodiments of the method may include calculating or determining a location of the point inside the eye of the viewer relative to a location of the facial feature. In some embodiments, the change in the location of said iris is less than the size of a pixel of the second image.

Figure 3:
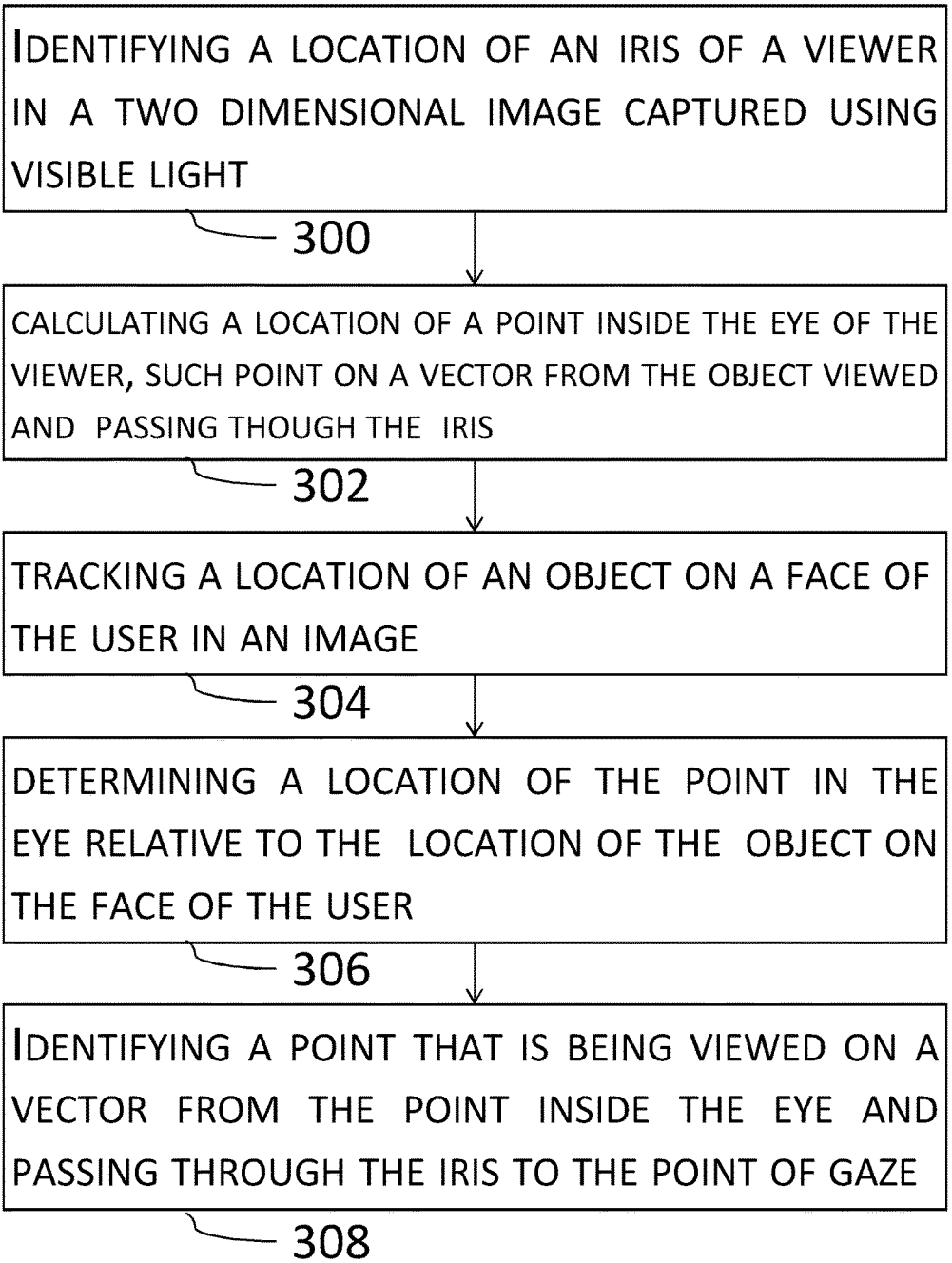
FIG. 3 shows a flow diagram for identifying a point that is being viewed, according to some embodiments of the invention.

Reference is now made to FIG. 3, which shows a flow diagram for identifying a point that is being viewed, according to some embodiments of the invention. Embodiments of the invention may include in block 300 identifying in a two-dimensional image of a viewer captured using visible light, a location of an iris of the viewer relative to a location of the imager. In one embodiment the imager is located or positioned at a known location relative to an object viewed by the viewer. In block 302, some embodiments of the method may include calculating or determining a location of a point inside the eye, such point being on a vector from the object viewed by the viewer, and passing though the iris. In block 304, a location of an object on a face of the user may be tracked, as the face is captured (in an image) by the imager. In block 306, a location of the point in the eye may be determined relative to the location of the object on the face of the user. In block 308, some embodiments of the method may include identifying the point of gaze on a vector from the point inside the eye and passing through the iris to the point of gaze. In some embodiments, the imager may be a mobile imager and the object viewed by the viewer may be displayed on a mobile device connected to the imager.

Figure 4A:
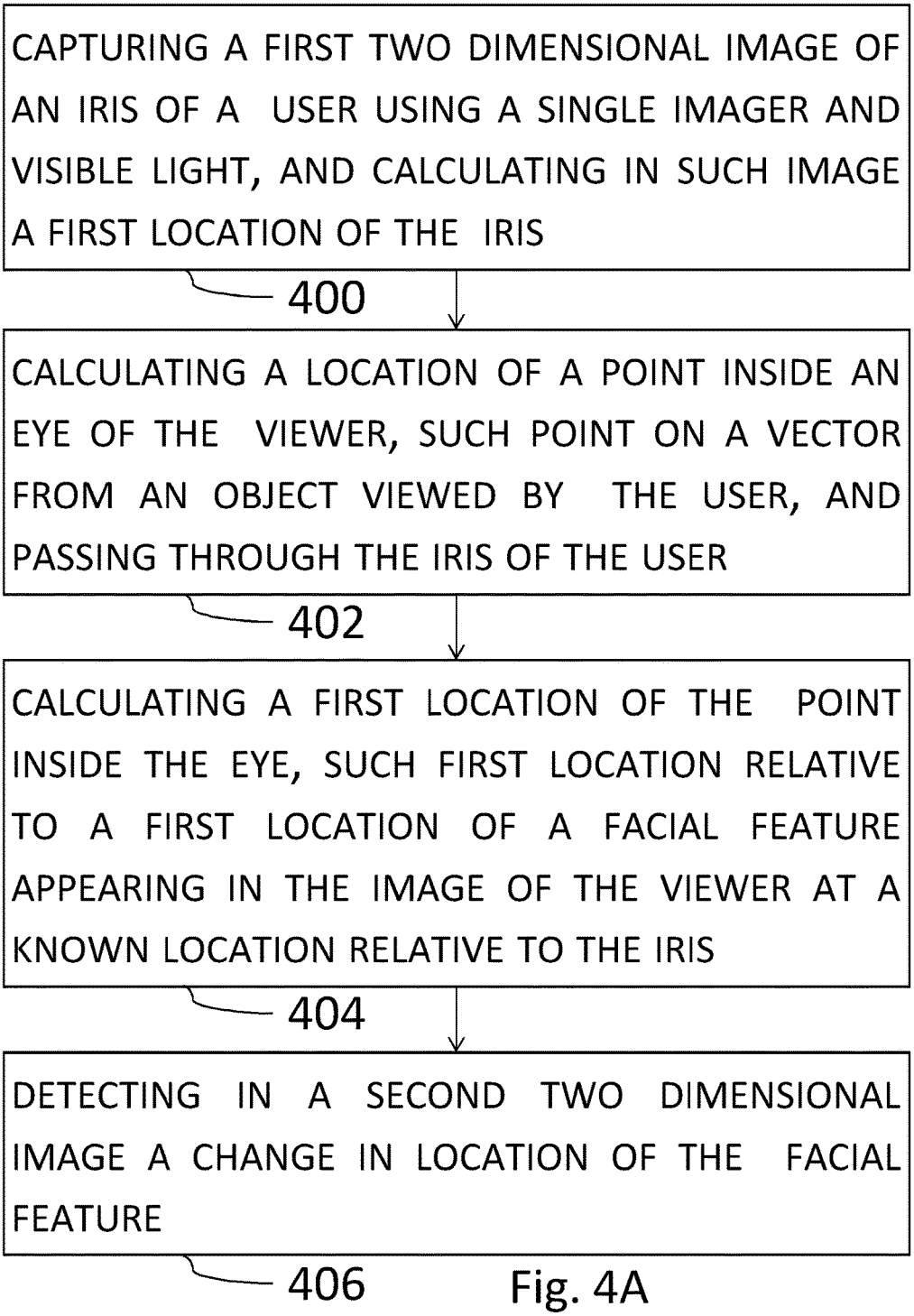
FIG. 4A shows a flow diagram for detecting a change in location of a facial feature, according to some embodiments of the invention.

Reference is now made to FIGS. 4A-4B, which show a flow diagram for identifying an object that is the subject of a gaze, according to some embodiments of the invention. Embodiments of the invention may include identifying an object that is the subject of a gaze of a viewer. In block 400, a first two-dimensional image of an iris of a user may be captured, using a single imager and visible light, and calculating a first location of the iris. As is shown in block 402, some embodiments of the method may include calculating or determining a location point inside an eye of the viewer, such point on a vector from an object viewed by the user, and passing through the iris of the user. As is shown in block 404, some embodiments of the method may include calculating or determining a first location of the point inside the eye, such first location relative to a first location of a facial feature of the viewer that is located or positioned at a known location relative to the iris of the user. As is shown in block 406, some embodiments of the method may include detecting in a second two dimensional image a change in location of the facial feature. As is shown in block 408, some embodiments of the method may include calculating or determining a second location of the point inside the eye upon the change in the location in the facial feature, and calculating a second location of the iris of the user. As is shown in block 410, an object that is the subject of the gaze of the viewer may be identified, the object being on a vector from the second location of the point inside the eye and passing through second location of the iris.

According to some embodiments, face and/or eye detection may be performed, using for example the Viola-Jones face (or eye) detection algorithm with a cascade-classifier object in open source computer vision (OpenCV) environment. In some embodiments, two eye region areas (or other areas) may be derived from the detected face in order to allow face detection and tracking.

According to some embodiments, it may be possible to reach higher resolution and/or accuracy by detecting and tracking eye corners following the tracking of the eye regions in order to correct and/or improve the position of the eye regions. In some embodiments, an iris and a size of an iris may be detected and calculated in an image or series of images.

According to some embodiments, utilizing a phased search, a subsequent phase may rely on the results of a prior phase, in order to allow tracking of the iris. In some embodiments, a validation stage may be added to the tracking method in order to validate the result, for instance at the end of the search. In case that the previous search gave a good result (for the search area), for instance a validated search accepted by the validation stage, then the new search area may be based on previous locations, e.g. with a small shift of 0.2 D, 0.3 D where D is the diameter of the iris. In some embodiments, a search area based on the last eye corner location(s) may be created so as to allow search area size that may be approximately 3D×2D (where D is the diameter of the iris). It should be noted that sizes of the search area as referred to herein may correspond to Cartesian coordinates with regard to the diameter of the iris (D).

It should be noted that once a search area is found, the darkest area within the search area may be determined (for example in order to determine or find the pupil, which may be the darkest part of the eye). In some embodiments, the search may be performed in a search window that is in proportion to the size of the iris plus the weight value of the iris's brightness values relatively to the iris's brightness values in the previous frame. It should be appreciated that a search window may be set around the position obtained determination of the 'darkest' stage, adding a shift vector which value may be between the previous frame's 'darkest' stage value and the previous frame's 'accurate' stage value. The search window size may be set by the size of the movement between the current frame's 'darkest' stage value and the previous frame 'darkest' stage value. In some embodiments, upon detection of a small movement, a 'Template' stage may be initiated with a correction may be applied with a shift of for instance 0.1 D, 0.15 D (in Cartesian coordinates), while other movements may be corrected with a shift of 0.2 D, 0.3 D (where D is the diameter of the iris). In some embodiments, a circular shape (taking into account that some part of the circle may not be visible, e.g. covered by the eyelids), corresponding to the iris diameter and eye aperture (calculated in the previous frame), may be detected wherein edges of the circle may have the sharpest dark to light value transitions.

It should be noted that the eye aperture may be calculated to be the largest distance between the highest point in the upper eyelid and the lowest point in the lower eyelid. Each point may be calculated as the sharpest dark to light value transition where the starting point is the location that was obtained from the 'Template' stage.

According to some embodiments, in case that the previous search gave a good result (for the search area), for instance a validated search accepted by the validation stage, then the new search area may be based on the outcome locations of the previous stage, wherein a shift of up to 0.07 D may be applied to the search area (where D is the diameter of the iris). In some embodiments, edge points may be sampled while giving more weight to the inner side being dark. It should be appreciated that these points may be used to match a circle via for example the Weighted-Least-Squares algorithm while constraining the algorithm with the last known diameter (of the iris). This process may be carried out on an enlarged search window using for example bi-cubic interpolation, for example to reach sub-pixel level of values as well as comparing the edge pixel to the pixels on each side to determine what percentage of the edge pixel is occupied by the iris. It should be noted that as used herein, the captured image may be divided into or formed of a plurality of pixels of a known size.

For example, where the edge of the iris and/or pupil occupies only part of a complete pixel in an image, a change in the portion of the pixel that is so occupied by the iris or a change in the percentage of the pixel that is so occupied by the iris may be detected. Such change may be interpreted as a movement of the iris.

According to some embodiments, the results of a previous search may be disqualified with, for example, at least one of the following: output of eye distance that is significantly larger than the previous eye distance, eye angle that is significantly larger than the previous eye angle (wherein the eye angle is the slope between the two eyes), and an iris value mean difference that is significantly larger than the previous value, and according to a score of the eye shape obtained via the Weighted-Least-Squares algorithm.

According to some embodiments, the inner corners of the eye may be detected within the captured frame. As mentioned above, face detection may be carried out using for example Viola-Jones face detection algorithm with the Cascade-Classifier object in OpenCV. In some embodiments, in an area derived from the detected face area and based on the locations of the iris, it may be possible to search for optional corners in the area of the eyes closer to the center of the face using corner detection algorithms such as Harris corner detection in OpenCV, or other detection processes.

In some embodiments, an appropriate pair of corners may be selected by filtering out (e.g. removing or not considering) pairs wherein the angle between the line connecting the corners to the line connecting the iris centers is too large, e.g. above a predetermined value. Such a pair may be chosen by giving each pair a score according to a list of parameters. For example, the distance between each iris or eye area to the eye corner should be similar (assuming that the viewer is looking forward towards the camera). In another example, darker points may get a higher score. In another example, stronger Harris corner detection points may get a higher score. In another example, a smaller angle between the line connecting the irises and the line connecting the corners may get a higher score.

According to some embodiments, eye corners may be tracked by initially storing at least one of the following results of the detection process: the distance between the irises, the distance between the eye corners, the angle between the line connecting the irises and the line connecting the corners (if the lines are parallel, then the angle may be zero). In some embodiments, two templates containing each of the eye's inner corners may be stored for areas to the side of the detected iris areas, wherein the template areas may occupy less space of the eye and more of the nose. Other tracking methods may be used.

According to some embodiments, eye corners may be tracked by checking the distance between the irises, in the new frame, and apply the same change to the distance between the corners. In addition, it may be required to maintain the angle between the line connecting the irises to the line connecting the corners, without any change.

In some embodiments, small search windows may be defined based on face tracking results, and the position of the corners in the last frame relative to the face tracking results in the last frame.

In some embodiments, the Sum of Absolute Differences (SAD) algorithm or Sum of Difference (SSD) may be used to search for an area similar to the template (since both corners move together and their new ratio is therefore known) taking into account the positions in the last frame, the preceding five frames and the first frame, or other sets of previous frames. In some embodiments, a sub-pixel level of the corner tracking may be added on an enlarged search window using for example bi-cubic interpolation in addition to or instead of comparing SAD/SSD results on both sides of the detected corner, and thereby evaluating to which side the corner is more similar and at what percentage.

In some embodiments, the movement from the found template area to the last template area may be calculated, whereby this may be detected as the inner corner's movement. In some embodiments, this correction may be applied to the tracking of the eye regions, and for instance stored for future new templates.

According to some embodiments, the nose-bridge and/or the nose-end may be detected and tracked. Initially, for nose-bridge tracking the lightest "Y" value area may be identified between the eyes, for example by tracking that area by searching for the lightest "Y" value area in a position relative to the eye region tacking position. It should be noted that the "Y" value refers to a "Y-CbCr" family of color spaces that may be used as a part of the color image pipeline in video and digital photography systems.

In some embodiments, for nose-end tracking a peak strip template may be defined where the center of the strip may be lighter (or brighter) than the sides of the strip. Next, a search may be carried out between the irises for the lightest peak strip, and then moving a pixel down a row and searching again for the lightest peak strip there. This may be repeated until the horizontal distance from the found peak point and the last peak point is larger than a predefined threshold. In some embodiments, the slope line may be found by fitting a linear line equation that is closest to all of the previously found peak points. Then, searching in the direction of the slope line for the nose-end strip with a high light to dark difference. The nose-end strip area may then be tracked by searching in a smaller area around the last location according to the head and/or eye strip movement.

Figure 5A:
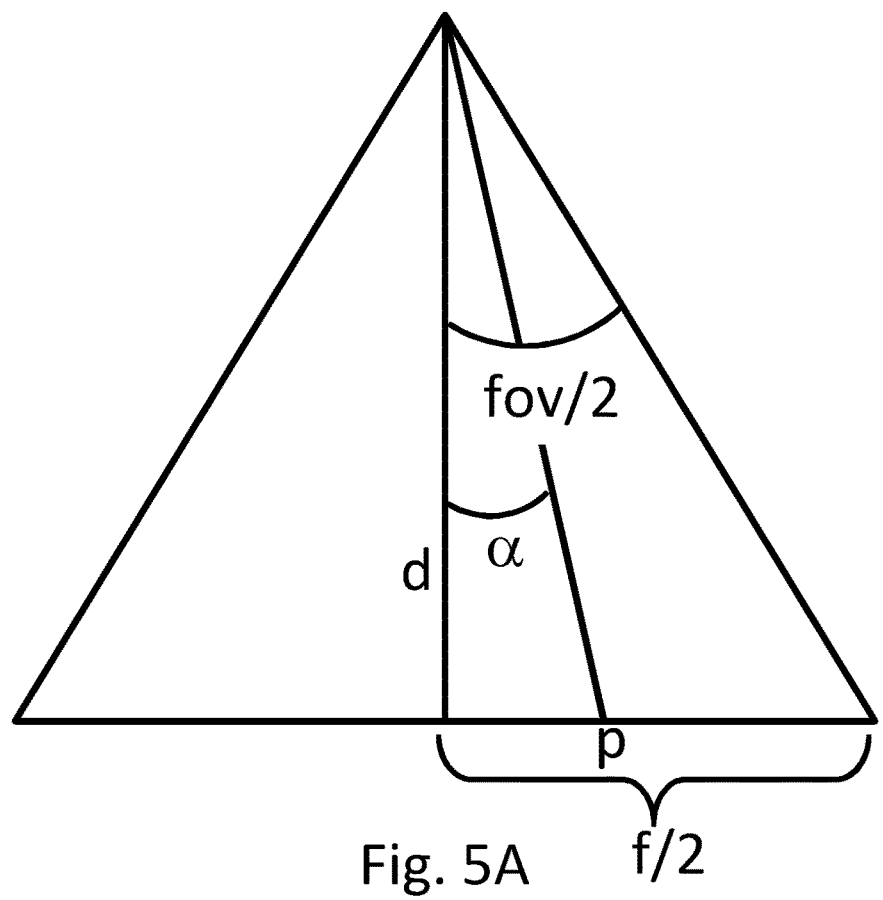
FIG. 5A shows geometric representation of angles in a field of view of the viewer, according to some embodiments of the invention.

Reference is now made to FIG. 5A, which shows geometric representation of angles in a field of view of the viewer, according to some embodiments of the invention. In some embodiments, the frame pixels of an object may be converted to angles in order to allow calculations of positioning for each pixel. It should be appreciated that as shown in FIG. 5A, 'f'—refers to the width and/or height of the frame, 'p'—refers to the object's location in the frame, 'd' refers to the distance from the camera, 'α'—refers to the angle between the 'Z' axis and the object location on the 'X' and/or 'Y' axis, and 'fov'—refers to the camera's field of view corresponding to the frame's width and/or height. Therefore, from this geometric representation the angle 'α' may be derived as a function of 'f', 'p', and 'fov':

$$\tan\left(\frac{fov}{2}\right) = \frac{\left(\frac{f}{2}\right)}{d} \Rightarrow d = \frac{f}{2\tan\left(\frac{fov}{2}\right)}$$

$$\tan(\alpha) = \frac{\left(\frac{f}{2}\right) - p}{d} = \frac{\left(\frac{f}{2} - p\right)\left(2\tan\left(\frac{fov}{2}\right)\right)}{f} \Rightarrow \alpha = \arctan\left(\frac{\left(\frac{f}{2} - p\right) \cdot 2\tan\left(\frac{fov}{2}\right)}{f}\right)$$

According to some embodiments, determination of the point of gaze may include detection of the position of the user's irises and eye corners, estimation of the position of the eyeball center based on the vector between the point of calibration (such as the camera or another known point) and the iris center, and continuing that vector based on an estimated eyeball radius or distance to a designated point within the eyeball. In some embodiments, the determination of the point of gaze may further include tracking of the position of the iris, tracking of the position of the eye corners and nose-bridge and calculation of the new position of the eyeball center. In some embodiments, the determination of the point of gaze may include calculation of the new vector between the eyeball center and the iris center, and finally estimation of the location or position of the point of gaze on the device screen.

According to some embodiments, calibration may be carried out in order to improve the determination of the location or position of the point of gaze. In some embodiments, a pixel-to-centimeter ratio may be determined. It should be noted that a corresponding ratio to any other unit may also be possible, for instance pixel-to-inch. If the size of an iris is found in pixels, a pixel-to-centimeter ratio may be set, while assuming an average general population iris size (about 1.18 cm), such that this ration may be dependent on the user's position relative to the camera:

$$\text{ratio} = \frac{\text{iris}_{cm}}{\text{iris}_{px}}$$

It should be appreciated that similar determination of the ratio may be carried out with other features of a known size of the general population or the specific user.

According to some embodiments, the center of the pupil may be determined in centimeters in three-dimensional space, wherein the location may be determined by the location of the iris in the frame. It should be noted that a corresponding unit of size may also be possible, for instance determined in inches.

In some embodiments, use of average values for vectors between eye-corners and eyeball centers may provide sufficient estimates of the gaze angle even without calibration, or as a basis upon which to start a gaze estimate until a complete calibration may be undertaken, and/or for applications where accuracy of gaze estimates is not critical, and/or as a confirmation that a user in fact looking at an object on a screen during a calibration. This average may be a world average or an average that fits a certain group of people who may use the device.

Figure 5B:
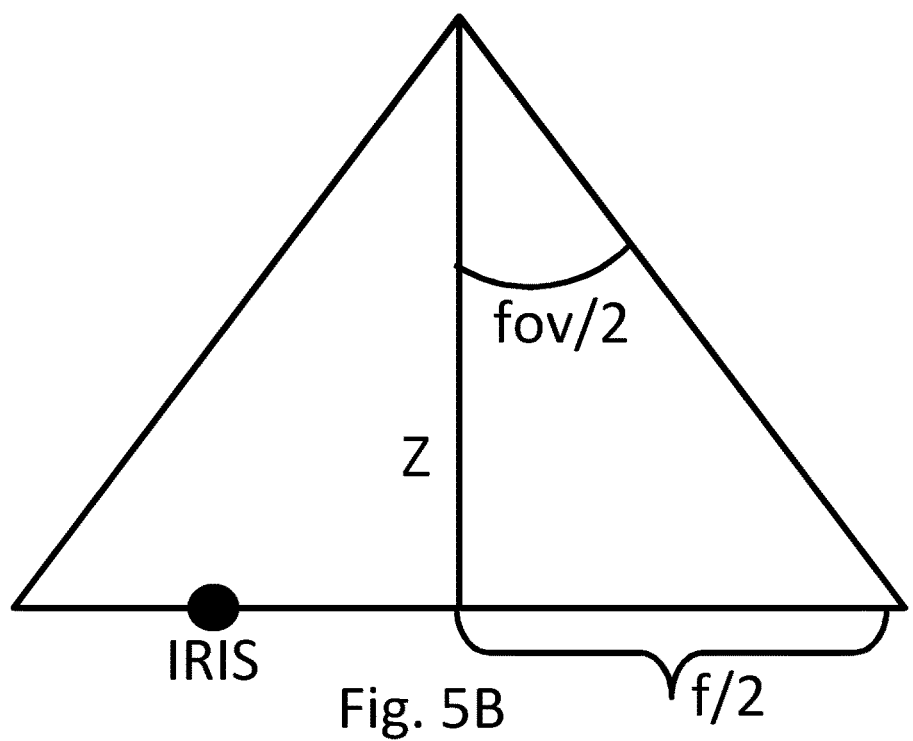
FIG. 5B shows geometric representation of angles in the field of view of the viewer for determination of pupil's location along the 'Z' axis, according to some embodiments of the invention.
Figure 5C:
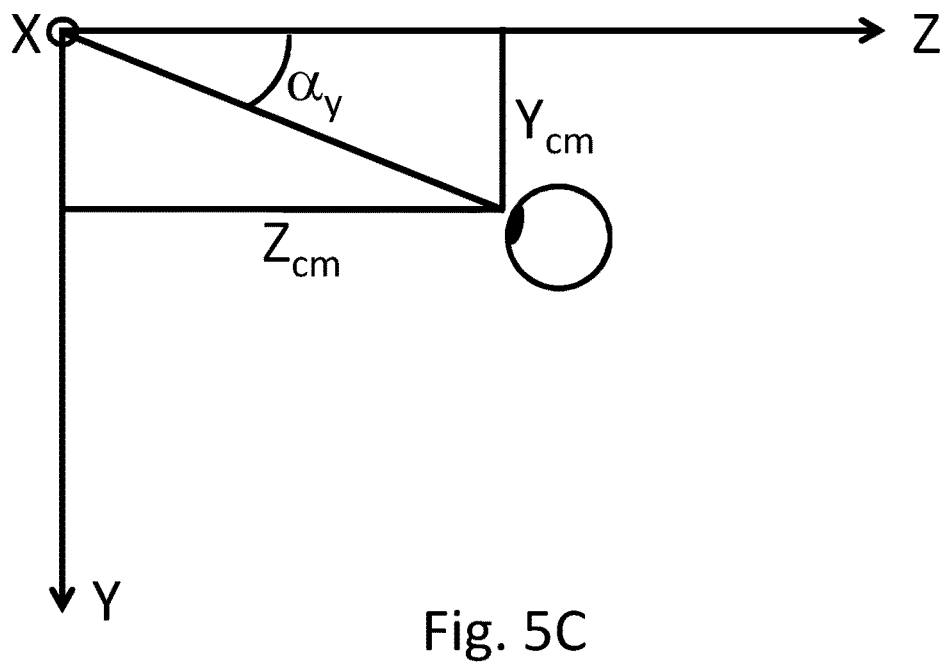
FIG. 5C shows geometric representation of angles in the field of view of the viewer for determination of pupil's location along the 'Y' axis, according to some embodiments of the invention.

Reference is now made to FIGS. 5B-5C, which show geometric representation of angles in the field of view of the viewer for determination of pupil's location along the 'Z' and 'Y' axes, respectively, according to some embodiments of the invention. The location of the pupil may be determined via the field of view of the camera. It should be appreciated that as shown in FIGS. 5B-5C, 'Xcm', 'Ycm', 'Zcm' refers to the pupil location relative to the camera, 'f'—refers to the width and/or height of the frame, 'IRIS'—refers to the iris's location in the frame, '$\alpha_{x/y}$'—refers to the angle between the 'Z' axis and the iris location on the 'X' and/or 'Y' axis, and 'fov'—refers to the camera's field of view corresponding to the frame's width and/or height. Therefore, from this geometric representation the location '$Z_{cm}$' may be derived as a function of 'f', 'fov', and ration calculated above:

$$\tan\left(\frac{fov}{2}\right) = \frac{\left(\frac{f}{2}\right)}{Z} \Rightarrow Z_{cm} = \frac{f}{2\tan\left(\frac{fov}{2}\right)} \cdot \text{ratio}$$

According to some embodiments, the location of the pupil may be determined via the field of view of the camera along the 'Y' axis. The value for '$\alpha_y$' may be calculated by converting the user's location on the 'Y' axis to angles (for instance as described above).

$$\alpha_y = \arctan\left(\frac{\left(\frac{f_h}{2} - p_y\right) \cdot 2\tan\left(\frac{fov_h}{2}\right)}{f_h}\right),$$

$$Y_{cm} = \tan(\alpha_y) \cdot Z_{cm}$$

Similarly, the location of the pupil may be determined via the field of view of the camera along the 'X' axis. The value for '$\alpha_y$' may be calculated by converting the user's location on the 'X' axis to angles (for instance as described above).

$$\alpha_x = \arctan\left(\frac{\left(\frac{f}{2} - p\right) \cdot 2\tan\left(\frac{fov}{2}\right)}{f}\right),$$

$$X_{cm} = \tan(\alpha_x) \cdot Z_{cm}$$

Figure 6:
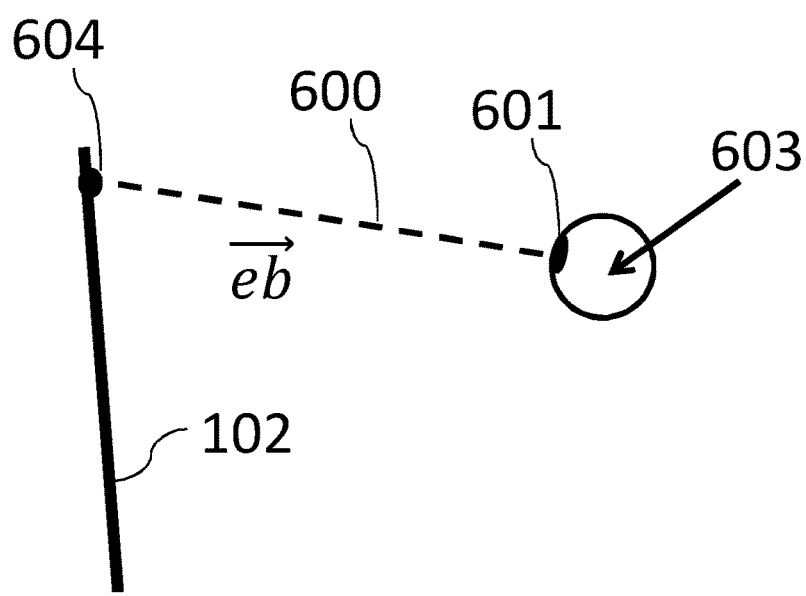
FIG. 6 shows geometric representation of the line of sight between the viewer and the camera, according to some embodiments of the invention.

Reference is now made to FIG. 6, which shows geometric representation of the line of sight between the viewer and the camera, according to some embodiments of the invention. According to some embodiments, the vector from the camera 604 to the middle of the eyeball may be determined. In some embodiments, the middle of eyeball 603 may be determined in three-dimensional space by initially calibrating the view of the user with the camera 604. This may be carried out by adding the eyeball radius, towards the calibration 600 direction, to the middle of the pupil 601 when the user is looking at the camera 604.

It should be appreciated that for direction (or vector) calculations, 'eb'—refers to the eyeball vector from the camera 604 to the middle of the eyeball, 'p'—refers to the pupil vector from the camera 604 to the center of the pupil 601, and 'r'—refers to the eyeball radius vector with the eyeballs radius and direction of the pupil vector, such that $\vec{eb} = \vec{p} + \vec{r}$, wherein 'eb' may coincide with calibration direction 600. It should be noted that for typical users, the eyeball radius may be estimated at about 1.25 cm.

According to some embodiments, the nose-bridge and eye corner angles and distances may be determined. In some embodiments, the distance between two eye corners may be derived by defining the following: 'c'—refers to the left/right eye corner location in the frame, 'h'—refers to the nose-bridge height in centimeters as the nose-bridge height distance from the face, and may be defined as a constant (e.g. of 1.5 cm). It should be appreciated that other values and/or other constants may also be similarly defined for specific populations (for instance different values for users in Asia and Europe). Furthermore, "$d_{clcr}$"—refers to the distance between corners on the 'X' axis in centimeters, '$\alpha_i$'—refers to the angle between left corner and right corner of the nose-bridge, and '$d_{nc}$'—refers to the distance between the nose-bridge and an eye corner. Therefore, the distance between the two eye corners may be calculated (e.g. in centimeters), as the following: $d_{clcr} = \sqrt{(c_{r,x} - c_{l,x})^2 + (c_{r,y} - c_{l,y})^2}$ assuming that for the calibration the distance vector between the two eye corners is parallel to the camera plane ('X', 'Y').

Accordingly, the angle between the nose-bridge to the left eye corner and to the right eye corner may be calculated as:

$$\tan\left(\frac{\alpha_i}{2}\right) = \frac{\left(\frac{d_{clcr}}{2}\right)}{h} \Rightarrow \alpha_i = 2 \cdot \arctan\left(\frac{d_{clcr}}{2}\right).$$

In some embodiments, the distance between the nose-bridge and each corner point may be calculated using the Pythagorean theorem as:

$$d_{nc} = \sqrt{\left(\frac{d_{clcr}}{2}\right)^2 + h^2}.$$

According to some embodiments, the gaze of the viewer may be tracked by for instance locating a new center of the pupil in the next frame using iris tracking (as described above).

Figure 7:
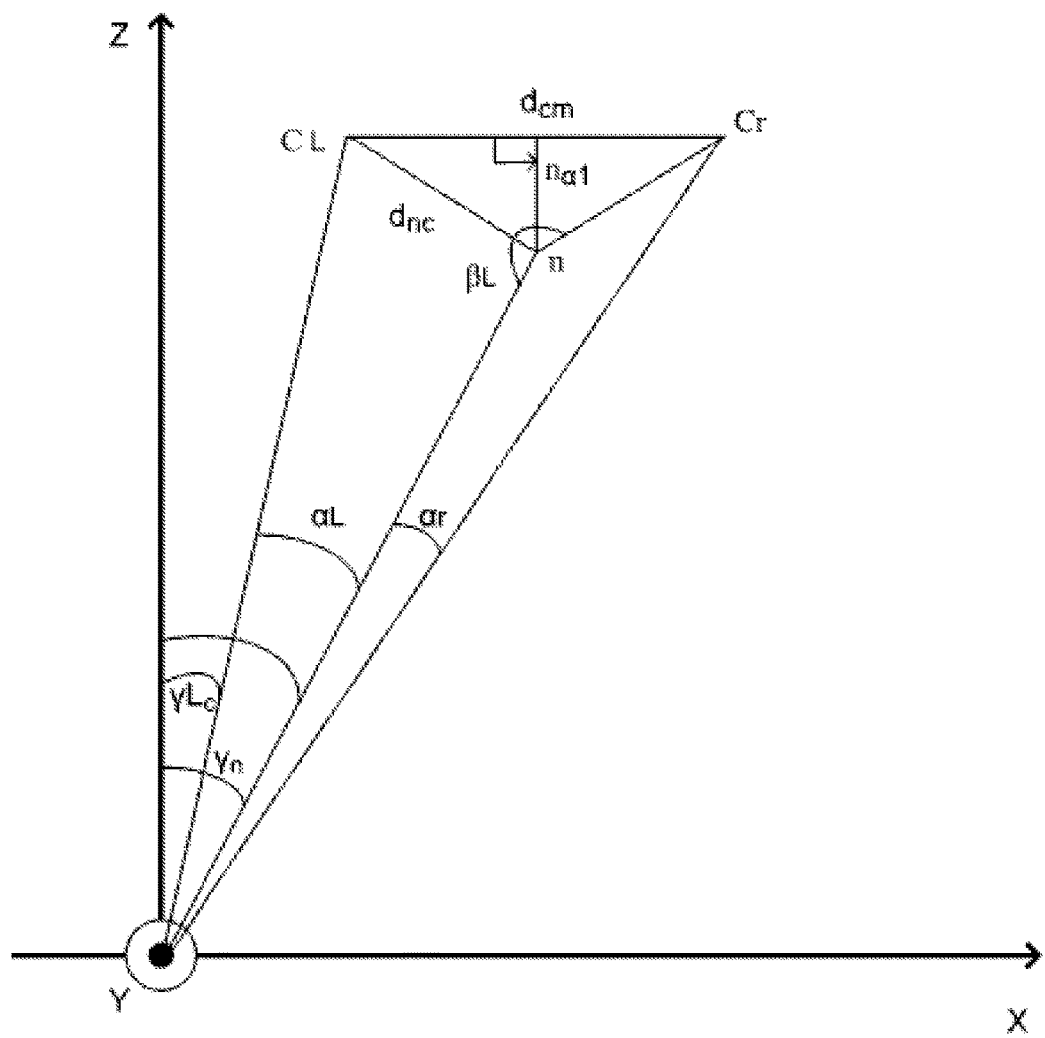
FIG. 7 shows geometric representation of angles and distances for the pupil of the viewer, according to some embodiments of the invention.

Reference is now made to FIG. 7, which shows geometric representation of angles and distances for the pupil of the viewer, according to some embodiments of the invention. In some embodiments, angles and distances may be calculated in order to determine new eye corner vectors, by defining the following: 'c'—refers to the left/right eye corner location in the frame, 'h'—refers to the nose-bridge height in centimeters as the nose-bridge height distance from the face, and may be defined as a constant (e.g. of 1.5 cm). Furthermore, 'n'—refers to the nose bridge (point between the eyes) location in the frame, '$\gamma_{n,x}$'/'$\gamma_{n,y}$'—refers to the angle between the 'Z' axis and the nose-bridge, '$\gamma_{lc,x}$'/'$\gamma_{lc,y}$'—refers to the angle between the 'Z' axis and the left corner, '$\gamma_{rc,x}$'/'$\gamma_{rc,y}$'—refers to the angle between the 'Z' axis and the right corner, '$\alpha_l$'—refers to the angle between camera-nose-bridge and camera-left corner, and '$\alpha_r$'—refers to the angle between camera-nose-bridge and camera-right corner. Furthermore, "$d_{clcr}$"—refers to the distance between corners on the 'X' axis in centimeters (e.g. calculated in calibration), "$d_{nc}$"—refers to the distance between the nose-bridge and corner (e.g. calculated in calibration), "$d_{clc}$"—refers to the distance between the camera and left corner, '$\alpha_i$'—refers to the angle between nose-bridge left corner and nose-bridge right corner (e.g. calculated in calibration), '$\beta_1$'—refers to the angle between nose-bridge camera and nose-bridge left corner, '$\alpha_y$'—refers to the angle of head rotation around the 'Y' axis, and '$\alpha_z$'—refers to the angle of head rotation around the 'Z' axis. The locations Cl, Cr, n for each frame may be represented (in parametric representation) by the following line equations:

$$l_{Cl}: Z_{Cl} \cdot (X_{Cl}, Y_{Cl}, 1) = Z_{Cl} \cdot \vec{V}_{Cl}$$

$$l_{Cr}: Z_{Cr} \cdot (X_{Cr}, Y_{Cr}, 1) = Z_{Cr} \cdot \vec{V}_{Cr}$$

$$l_n: Z_n \cdot (X_n, Y_n, 1) = Z_n \cdot \vec{V}_n$$

It should be appreciated that with these definitions (as represented in FIG. 7), the angle between the lines '$l_{Cl}$' and '$l_n$' (the angle between the line from the nose-bridge to the camera and the line from the left eye corner to the camera) may be calculated as the dot-product:

$$\alpha_l = \arccos\left(\frac{\vec{V}_{Cl} \cdot \vec{V}_n}{|\vec{V}_{Cl}| \cdot |\vec{V}_n|}\right)$$

Similarly, the angle between the line from the nose bridge to the camera and the line from the right eye corner to the camera may be calculated as:

$$\alpha_r = \arccos\left(\frac{\vec{V}_{Cr} \cdot \vec{V}_n}{|\vec{V}_{Cr}| \cdot |\vec{V}_n|}\right).$$

Figure 8:
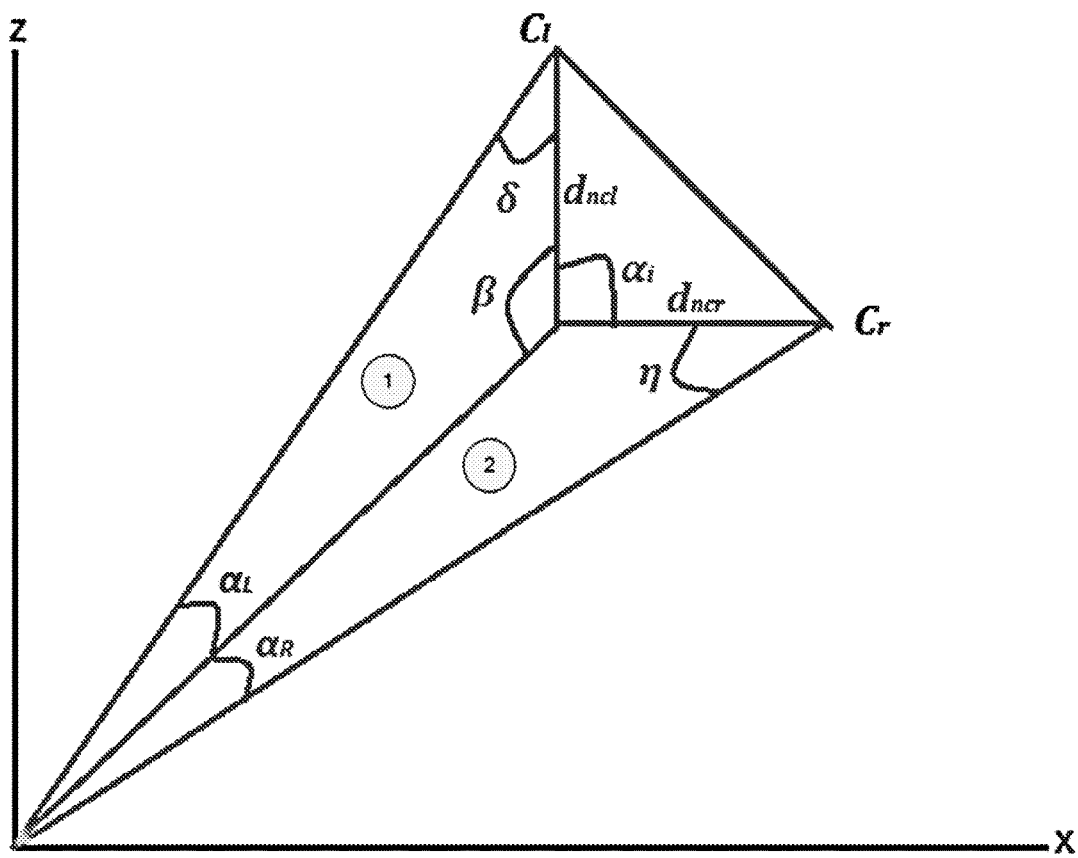
FIG. 8 shows geometric representation of an angle between the nose-bridge to camera and to left eye corner of the viewer, according to some embodiments of the invention.

Reference is now made to FIG. 8, which shows geometric representation of an angle between the nose-bridge to camera and to left eye corner of the viewer, according to some embodiments of the invention. In some embodiments, in order to calculate '$\beta$', the angle calculate the angle between the line connecting the nose bridge and the camera to the line connecting the nose bridge to the left eye corner, the unknown angles may be defined with '$\alpha$' and '$\beta$':

$$\delta = 180 - \alpha_l, \eta = \beta + \alpha_l - 180 - \alpha_r.$$

Then, solving three linear equations with three variables $Z_{cl}$, $Z_{cr}$, $Z_n$ (expressing the location Cl, Cr, and n) as the distance of the plane passing through each of these points and parallel to the 'X', 'Y' plane:

$$P_{Cl}: \left(\left(X_{Cl} - \frac{f_w}{2}\right) \cdot \frac{Z_{Cl}}{Z}, \left(Y_{Cl} - \frac{f_n}{2}\right) \cdot \frac{Z_{Cl}}{Z}, Z_{Cl}\right)$$

$$P_{Cr}: \left(\left(X_{Cr} - \frac{f_w}{2}\right) \cdot \frac{Z_{Cr}}{Z}, \left(Y_{Cr} - \frac{f_n}{2}\right) \cdot \frac{Z_{Cr}}{Z}, Z_{Cr}\right)$$

$$P_n: \left(\left(X_n - \frac{f_w}{2}\right) \cdot \frac{Z_n}{Z}, \left(Y_n - \frac{f_n}{2}\right) \cdot \frac{Z_n}{Z}, Z_n\right)$$

Where 'Z' is the distance in pixels from the camera $$Z = \frac{F_w}{2 \cdot \tan\left(\frac{fov}{2}\right)}$$

and the following are the locations (in pixels) on the nose and the eye corners: $(X_{Cl}, Y_{Cl})$, $(X_{Cr}, Y_{Cr})$, $(X_n, Y_n)$. Next, calculating:

$$d_{nCl} = |P_n - P_{Cl}|$$

$$d_{nCr} = |P_n - P_{Cr}|$$

$$d_{ClCr} = |P_{Cl} - P_{Cr}|$$

Where $d_{nCl}$, $d_{nCr}$, $d_{ClCr}$ have been determined during the calibration. Then substituting with $$X' = \frac{X - \frac{f_w}{2}}{Z}, Y' = \frac{Y - \frac{f_w}{2}}{Z}$$

to receive:

$$d_{nCl}^2 = (X'_n \cdot Z_n - X'_{Cl} \cdot Z_{Cl})^2 + (Y'_n \cdot Z_n - Y'_{Cl} \cdot Z_{Cl})^2 + (Z_n - Z_{Cl})^2$$

$$d_{nCr}^2 = (X'_n \cdot Z_n - X'_{Cr} \cdot Z_{Cr})^2 + (Y'_n \cdot Z_n - Y'_{Cr} \cdot Z_{Cr})^2 + (Z_n - Z_{Cr})^2$$

$$d_{ClCr}^2 = (X'_{Cr} \cdot Z_{Cr} - X'_{Cl} \cdot Z_{Cl})^2 + (Y'_{Cr} \cdot Z_{Cr} - Y'_{Cl} \cdot Z_{Cl})^2 + (Z_{Cr} - Z_{Cl})^2$$

Such non-linear set of equations may be solved for example iteratively using the Newton-Raphson algorithm, starting from the last position of the points. Once the old points and new points are aligned, the rotation of the head may be calculated with a quaternion (q):

$$q = q_r + iq_x + jq_y + kq_z,$$

where $|q|=1$.

To determine the rotated vector, the quaternion may be applied onto a vector between the points, for example on $\vec{V}_{ClCr}$, with $q \cdot \vec{V}_{ClCr(k-1)} \cdot q^{-1} = \vec{V}_{ClCr(k)}$ where $$q^x = q_r - iq_x - jq_y - kq_z$$

Defining 'Q' as the rotation angle and $\vec{V}_r$ as the rotation axis that is perpendicular to $\vec{V}_{ClCr(k-1)}$, $\vec{V}_{ClCr(k)}$, the quaternion may be:

$$q_r = \cos(Q), q_x = V_{rx} \cdot \sin(Q), q_y = V_{ry} \cdot \sin(Q), q_z = V_{rz} \cdot \sin(Q).$$

$$\vec{V}'_r = \vec{V}_{ClCr(k-1)} \times \vec{V}_{ClCr(k)}, \vec{V}_r = \frac{\vec{V}'_r}{|\vec{V}'_r|} \text{ and}$$

$$Q = \arccos\left(\frac{\vec{V}_{ClCr(k-1)} \cdot \vec{V}_{ClCr(k)}}{|\vec{V}_{ClCr(k-1)} \cdot \vec{V}_{ClCr(k)}|}\right) \text{ so that}$$

$$q = \cos(Q) + \sin(Q) \cdot (iV_{rx} + jV_{ry} + kV_{rz}).$$

And finally, applying the quaternion on the vector $\vec{V}_{Cl,eCl}$ between the left corner and the center of the left ball $P_{ebl}$, as well as the vector $\vec{V}_{Cr,eBr}$ between the right corner and the center of the right ball $P_{ebr}$ (determined during calibration) and result with the following:

$$P_{eCl} = P_{Cl} + q \cdot \vec{V}_{Cl,eBl} \cdot q^x$$

$$P_{eCr} = P_{Cr} + q \cdot \vec{V}_{Cr,eBr} \cdot q^x$$

Figure 9:
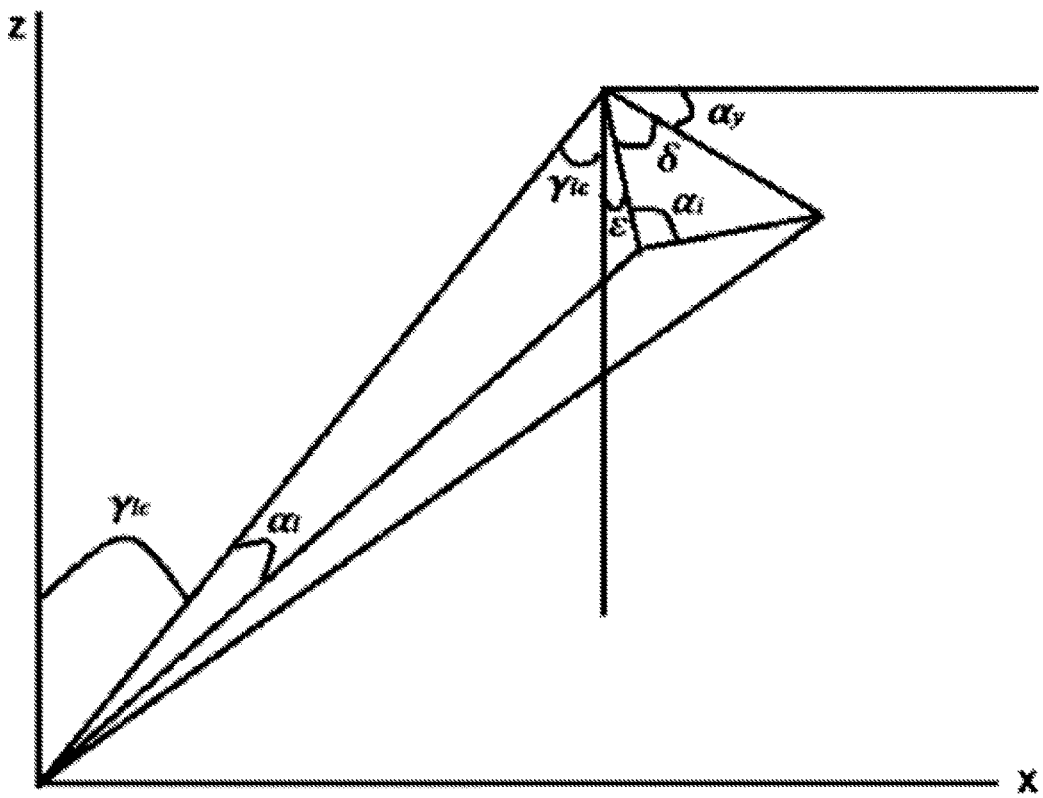
FIG. 9 shows geometric representation of an angle of head rotation of the viewer around the 'Y' axis, according to some embodiments of the invention.

Reference is now made to FIG. 9, which shows geometric representation angle of head rotation of the viewer around the 'Y' axis, according to some embodiments of the invention. In some embodiments, the angle of head rotation around the 'Y' axis may be calculated by draw a line from the left eye corner that's parallel to the 'X' axis and a line that's parallel to the 'Z' axis. The head rotation angle around the 'Y' axis is therefore the angle between the line parallel to the 'X' axis and the line connecting the two eye corners. In order to calculate that angle the following calculation may be carried out:

$$\delta = \frac{180 - \alpha_i}{2}, \varepsilon = 180 - \alpha_l - \beta_l - \gamma_{lc,x}$$

$$\alpha_y = 90 - \frac{180 - \alpha_i}{2} - (180 - \alpha_l - \beta_l - \gamma_{lc,x}) \Rightarrow \alpha_y = \frac{\alpha_i}{2} - 180 + \alpha_l + \beta_l + \gamma_{lc,x}$$

According to some embodiments, the distance between the camera and the left corner may be calculated by using the law of sines as follows:

$$\frac{d_{clc}}{\sin(\alpha_i)} = \frac{d_{nc}}{\sin(\alpha_l)} \Rightarrow d_{clc} = \frac{d_{nc} \cdot \sin(\alpha_i)}{\sin(\alpha_l)}$$

Figure 10:
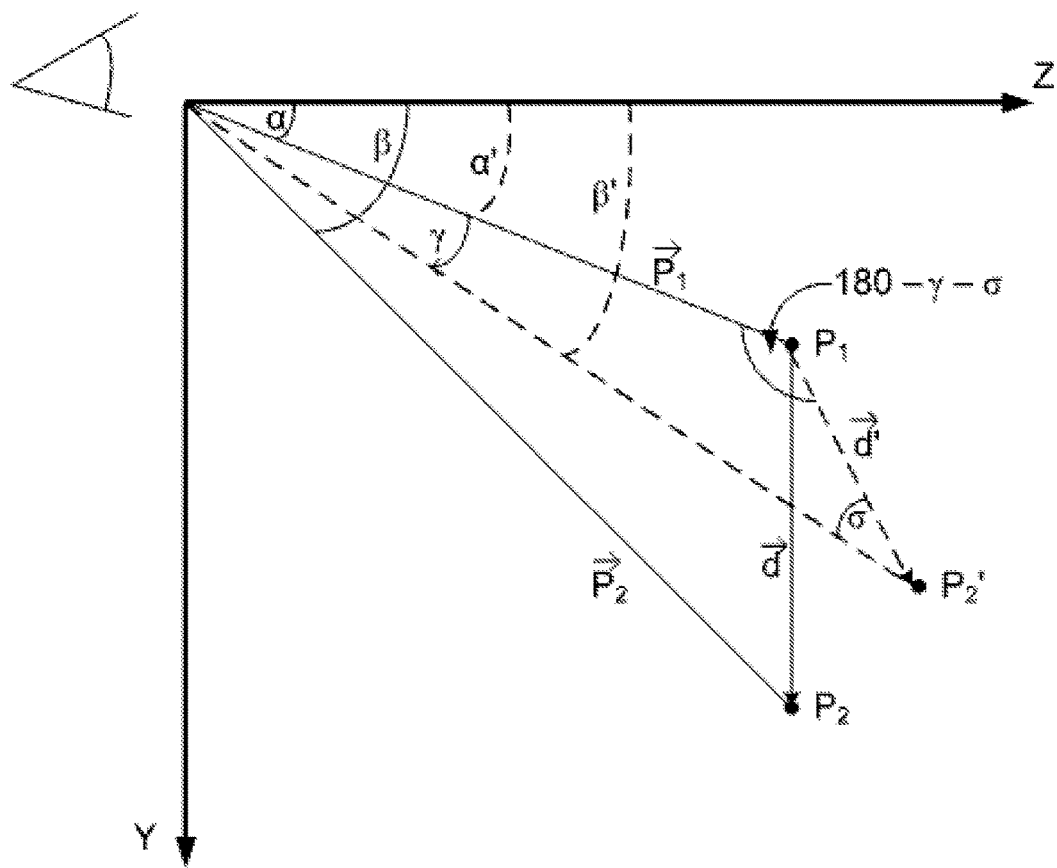
FIG. 10 shows geometric representation of an angle of head rotation of the viewer around the 'X' axis, according to some embodiments of the invention.

Reference is now made to FIG. 10, which shows geometric representation angle of head rotation of the viewer around the 'X' axis, according to some embodiments of the invention. In order to find the rotation around the 'X' axis a new point in addition to the eye corners may be tracked, for example beneath the nose, which rotates around the 'X' axis when the head of the viewer rotates. Given the angles between the camera and both tracking points on the 'Y'-axis, and the real difference between these points, the rotation around the 'X'-axis may be calculated by defining the following: 'p1'—refers to the center point between the eye corners, 'p2'—refers to the nose-end, 'α'—refers to the angle from the camera to the point between the eye corners (in calibration), 'β'—refers to the angle from the camera to the nose end (in calibration), 'α'—refers to the angle from the camera to the point between the eye corners in the next frame, 'β'—refers to the angle from the camera to the nose-end in the next frame. Furthermore, 'l1'—refers to the distance from the camera to the point between the eye corners, 'l2'—refers to the distance from the camera to the nose-end in the next frame, 'd'—refers to the vector from the center point between the eye corners and the nose-end, 'd''—refers to the vector from the center point between the eye corners and the nose-end in the next frame, 'γ'—refers to the angle between the center point between the eye corners and the nose-end in the next frame, and 'σ'—refers to the angle between 'd' and 'l2'. Then, according to the law of sines:

$$\frac{|l_1|}{\sin \sigma} = \frac{|d'|}{\sin \sigma} \Rightarrow \sigma = \arcsin \frac{|l_1|}{|d'|} \quad \text{I)}$$

-continued $$\frac{|l_2|}{\sin(180-\sigma-\gamma)} = \frac{|d'|}{\sin\gamma} \Rightarrow |l_2| = \frac{|d'|\sin(180-\sigma-\gamma)}{\sin\gamma} \quad \text{II)}$$

$$\gamma = \alpha' - \beta' \quad \text{III)}$$

$$|d| = |d'| \Rightarrow \vec{d}' = \vec{l}_2 - \vec{l}_1 \quad \text{IV)}$$

It should be appreciated that the calculated angle of the 'd' vector may provide the angle of rotation around the 'X'-axis. In some embodiments, the vectors from the camera to each eye may be derived by using the angles and distances that were previously calculated. It should be noted that a corresponding calculation may apply to the right eye corner, using the right angles. Thus, for the left eye corner:

$$x_{cm} = \sin(\gamma_{l,x}) \cdot d_{clc}, \; z_{cm} = \cos(\gamma_{l,x}) \cdot d_{clc}, \; y_{cm} = \tan(\gamma_{l,y}) \cdot z_{cm}$$

Figure 11A:
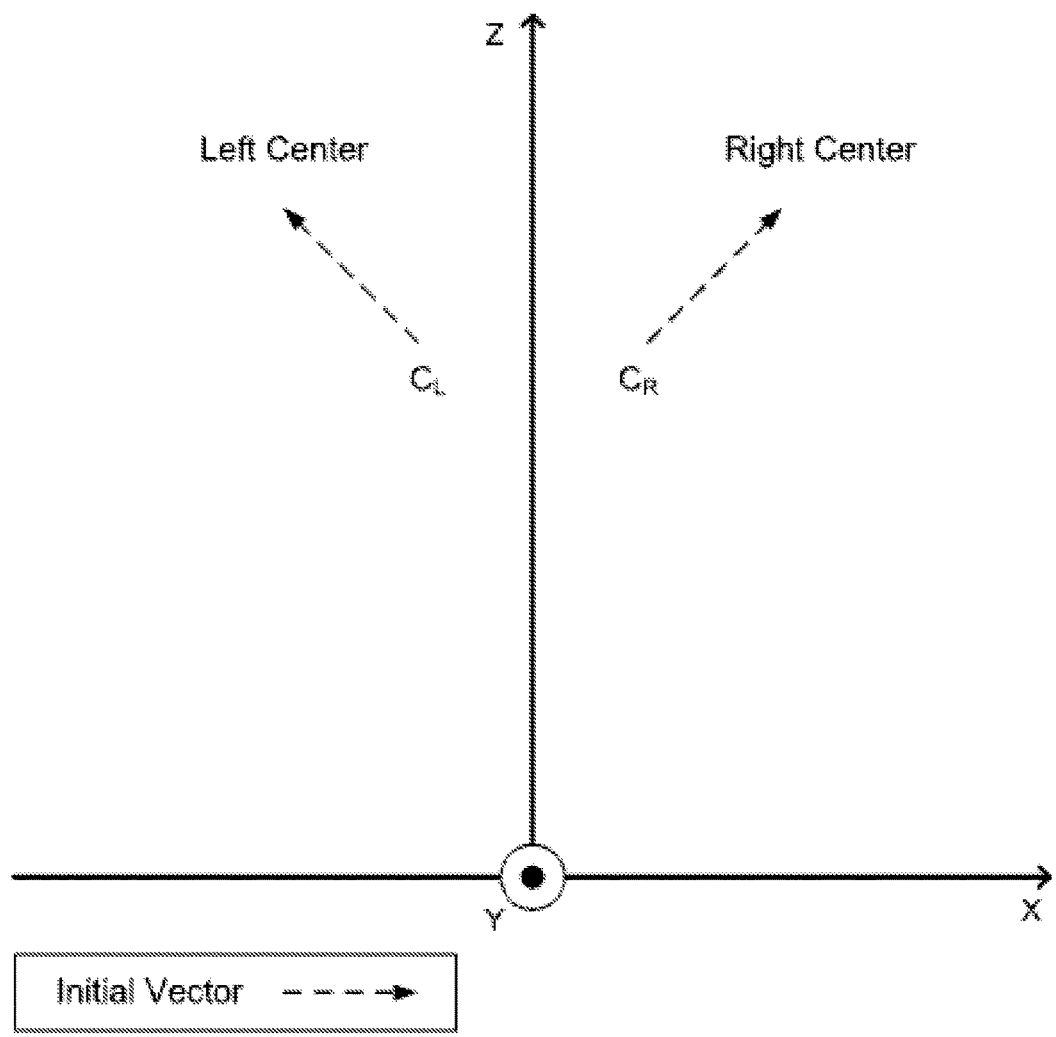
FIG. 11A shows geometric representation for new vectors from the camera to the center of each eyeball of the viewer during calibration, according to some embodiments of the invention.
Figure 11B:
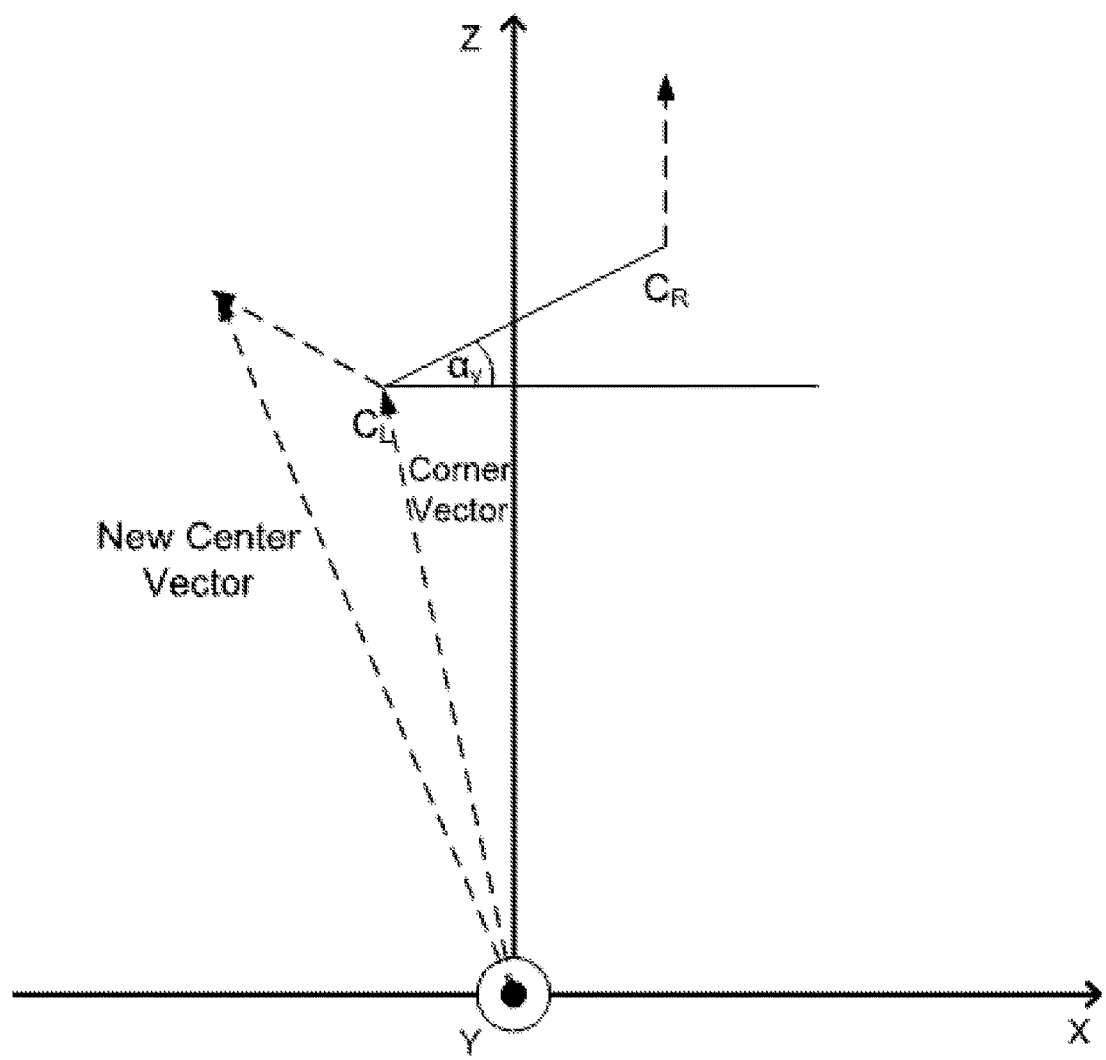
FIG. 11B shows geometric representation for new vectors from the camera to the center of each eyeball of the viewer after head rotation, according to some embodiments of the invention.

Reference is now made to FIGS. 11A-11B, which show geometric representation for new vectors from the camera to the center of each eyeball of the viewer, during calibration and after head rotation, according to some embodiments of the invention. It should be noted that the new vectors from the camera to the center of each eyeball may be calculated using the corner vectors and corners angle with the 'X' axis. This calculation may be carried out by rotating the initial vectors from the eye corners to the center of the eyeballs around the 'Y' axis by '$\alpha_y$' and around the 'Z' axis by '$\alpha_z$', and then adding it to the vectors from the center of the camera to the eye corners.

Figure 12:
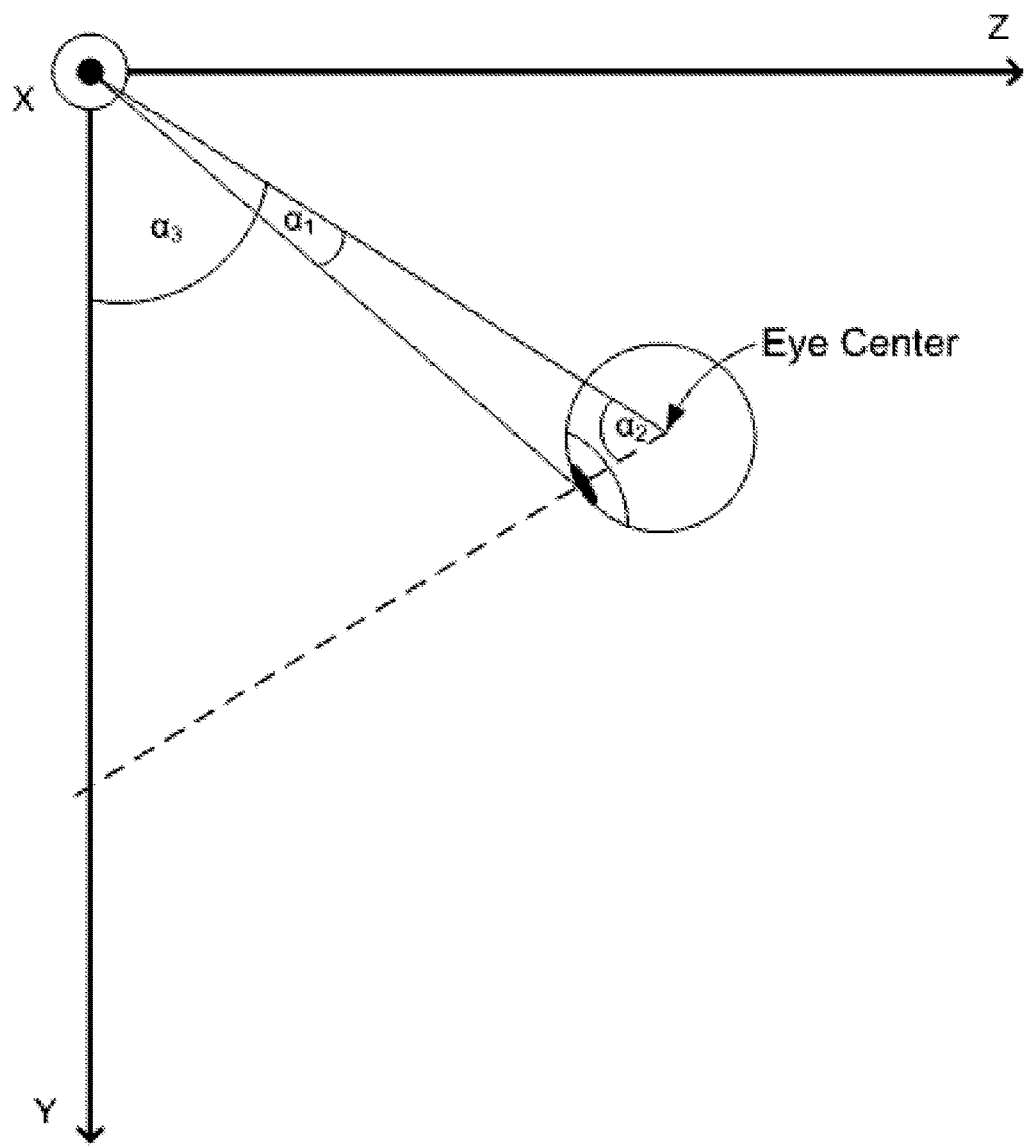
FIG. 12 shows geometric representation for the angle between the camera to the center of the eyeball and the center of the eyeball to the iris of the viewer, according to some embodiments of the invention.

Reference is now made to FIG. 12, which shows geometric representation for the angle between the camera to the center of the eyeball and the center of the eyeball to the iris of the viewer, according to some embodiments of the invention. It should be noted that the angle between the line connecting the camera and the center of the eyeball and the line connecting the center of the eyeball to the iris, may be calculated using the law of sins, by defining '$\alpha_1$'—refers to the angle between camera to the center of the eye and camera to the iris, '$\alpha_2$'—refers to the angle between the camera to the center of the eye and the center of the eye to the iris, '$d_1$'—refers to the distance between camera and eye center, and "$eye_{cm}$"—refers to the eyeball radius in centimeters. It should be appreciated that angle between the camera to the center of the eye and the center of the eye to the iris may be calculated as:

$$\alpha_2 = 180 - \alpha_1 - \arcsin\left[\frac{d_1 \cdot \sin(\alpha_1)}{eye_{cm}}\right].$$

Figure 13:
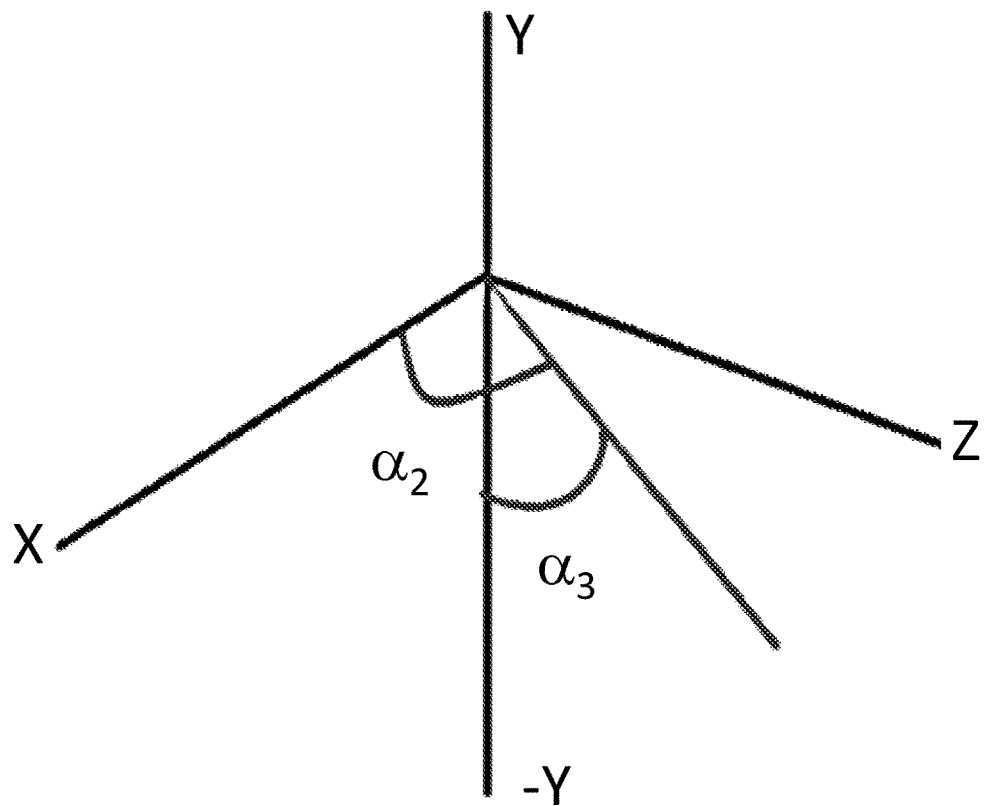
FIG. 13 shows geometric representation for the viewer's point of gaze, according to some embodiments of the invention.

Reference is now made to FIG. 13, which shows geometric representation for the viewer's point of gaze, according to some embodiments of the invention. It should be appreciated that the user's point of gaze on the device (e.g. in centimeters) may be derived using the law of sines, by defining '$\alpha_3$' refers to the angle between the line connecting the camera and the center of the eyeball and the negative 'Y' axis. Thus, the left eye point of gaze may be calculated by:

$$x_{cm} = \frac{\sin(\alpha_{2,x}) \cdot d_{1,x}}{\sin(PI - \alpha_{2,x} - \alpha_{3,x})}$$

$$y_{cm} = \frac{\sin(\alpha_{2,y}) \cdot d_{1,y}}{\sin(PI - \alpha_{2,y} - \alpha_{3,y})}$$

It should be noted that a corresponding calculation may be carried out to get the right eye point of gaze. Next, the point of gaze (e.g. in cm) may be converted relative to the camera to point of gaze in pixels on the screen based on the position of the camera to the origin of the screen's pixels axis and based on the screen pixel to cm ratio.

In some embodiments, as part of or following a calibration, coordinates, vectors and associations vectors between the eye-corners and eyeball centers or other face features may be stored so that a face pose (distance between eyes, distance between eyes and nose nostrils or mouth) may be available in a database on a device or on a server. Such data may be associated with face recognition data or other personal log-in data so that next time face recognition may pull or retrieve corresponding face data from the database, and quickly assemble relationships between eyeball centers and face coordinates. In some embodiments a log-in to an application on a device or to a social network page may allow an access to such data as may be stored.

Some embodiments may for example detect one degree of eye movement in an image where a diameter of an iris in an image occupies approximately 30 pixels, where the image is captured using a two dimensional camera in visible light.

According to some embodiments, identifying the point of gaze of the viewer of the display may allow the viewer to interact with the displayed content.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method for viewer gaze detection, the method comprising:
   capturing with an imager and using visible light, a first two-dimensional image of an iris and at least one facial feature of the viewer, wherein said imager is at a known location relative to a first object on an electronic display;
   capturing, using said imager, a second two-dimensional image of said iris and said at least one facial feature;
   calculating a location of a point inside of an eye of said viewer, said point on a vector from said first object and passing through said iris;
   calculating a location of said point inside said eye of said viewer relative to a location of said at least one facial feature;
   filtering out pairs of eye corners, wherein the angle between the length of the line connecting the corners to the line connecting the center of the iris centers is larger than a predefined value; and
   identifying a second object displayed on said electronic display, wherein said second object is the subject of a gaze of said viewer.

2. The method of claim 1, wherein said electronic display is a mobile display, and wherein said imager is a mobile imager.

3. The method as in claim 1, further comprising calculating a change between said first image and said second image, of a location of said iris and of a location of said facial feature.

4. The method as in claim 3, wherein said change in said location of said iris is less than the size of a pixel of said second image.

5. The method as in claim 1, further comprising identifying the nose-bridge of the viewer.

6. The method as in claim 1, further comprising identifying the nose-end of the viewer.

7. A method of identifying a point of gaze of a viewer, the method comprising:
- identifying a location of an iris of the viewer in a two-dimensional image of the viewer, said image captured by an imager using visible light, said imager at a known location relative to an object viewed by said viewer;
- calculating a location of a point inside said eye, said point on a vector from said object viewed by said user and passing though said iris;
- tracking a location of an object on a face of said user;
- determining a location of said point in said eye relative to said location of said object on said face of said user;
- filtering out pairs of eye corners, wherein the angle between the length of the line connecting the corners to the line connecting the center of the iris centers is larger than a predefined value; and
- identifying said point of gaze on a vector from said point inside said eye and passing through said iris to said point of gaze.

8. The method as in claim 7, further comprising tracking at least one corner of said eye.

9. The method as in claim 7, further comprising calculating the size of said iris.

10. The method as in claim 7, further comprising validating the results based on predetermined parameters.

11. The method as in claim 7, further comprising identifying the darkest area in said eye.

12. The method as in claim 7, further comprising identifying the nose-bridge of the viewer.

13. A method of identifying an object that is the subject of a gaze of a viewer, the method comprising:
- capturing a first two-dimensional image of an iris of a user, said capturing using a single imager and visible light, and calculating a first location of said iris;
- calculating a point inside an eye of a viewer, said point on a vector from an object viewed by the user passing through said iris of the user;
- calculating a first location of said point inside said eye, said first location relative to a first location of a facial feature of said viewer in said first image;
- detecting in a second two-dimensional image a change in location of said facial feature;
- calculating a second location of said point inside said eye upon said change in said location in said facial feature, and a second location of said iris;
- filtering out pairs of eye corners, wherein the angle between the length of the line connecting the corners to the line connecting the center of the iris centers is larger than a predefined value; and
- identifying said object that is the subject of the gaze of the viewer, on a vector from said second location of said point inside said eye and passing through said second location of said iris.

14. The method as in claim 13, further comprising calculating the size of said iris.

15. The method as in claim 13, further comprising validating the results based on predetermined parameters.

16. The method as in claim 13, further comprising identifying the darkest area in said eye.

17. The method as in claim 13, further comprising identifying the nose-bridge of the viewer.

18. A gaze detection system, comprising:
- an imager suitable to use visible light to capture two-dimensional images of an iris and of a facial feature of a viewer, said imager at a known position relative to objects being displayed on an electronic display;
- a processor configured to determine that an object of said objects is being viewed by said viewer at a defined time, wherein said imager is a mobile imager, and said electronic display is a mobile display; and
- wherein the processor is configured to:
- identify a location of an iris of the viewer in a two-dimensional image of the viewer captured by the imager;
- calculate a location of a point inside said eye, said point on a vector from said object viewed by said user and passing though said iris;
- track a location of an object on a face of said user;
- determine a location of said point in said eye relative to said location of said object on said face of said user;
- filter out pairs of eye corners, wherein the angle between the length of the line connecting the corners to the line connecting the center of the iris centers is larger than a predefined value; and
- identify said point of gaze on a vector from said point inside said eye and passing through said iris to said point of gaze.

* * * * *